May 10, 1932.   H. W. PIDGEON   1,857,400
JEW'S HARP
Filed Sept. 29, 1930
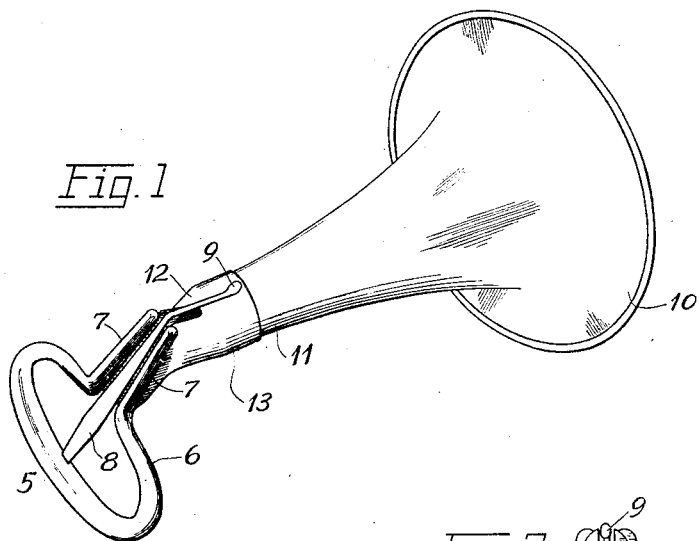
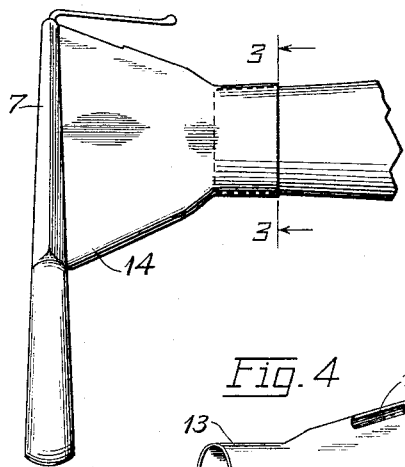
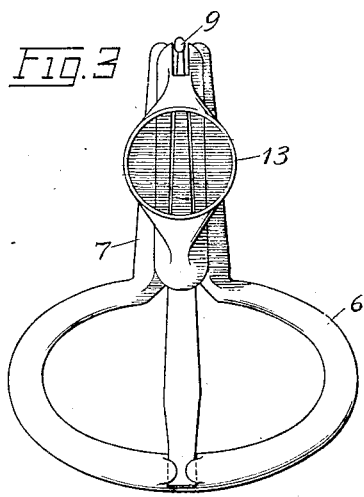
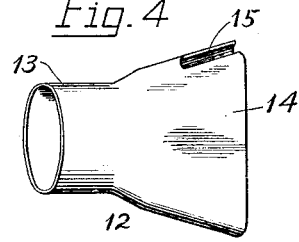
Inventor:
Harry W. Pidgeon
By
Attorney Patented May 10, 1932

1,857,400

UNITED STATES PATENT OFFICE

HARRY W. PIDGEON, OF CHICAGO, ILLINOIS

JEW'S HARP

Application filed September 29, 1930. Serial No. 485,022.

This invention relates to jews' harps and particularly to means for amplifying the sound of ordinary jews' harps. One object of the invention is to provide an amplifier which is portable, and of such a nature that the operator is not inconvenienced by its use. Another object is to provide an amplifier that is pleasing in appearance and inexpensive to make, and one which is easily detached from the harp itself.

Of the accompanying drawings Fig. 1 is a perspective view of a jew's harp, with an amplifier attached thereto, which embodies the features of my invention. Fig. 2 is a side elevation of the harp and the coupling for attaching it to the amplifying means. Fig. 3 is a view of the coupling and harp along the line 3—3 of Fig. 2; and Fig. 4 is a perspective view of the coupling alone.

In this instance I illustrate an ordinary type of jew's harp, but it is to be understood that modified forms thereof may be used with the amplifying means in substantially the same manner as is indicated. The jew's harp 5 comprises the ordinary frame 6 with the projecting teeth arms 7 and the tone producing tongue 8, the tongue being operated in the ordinary manner by the arm 9. The amplifier comprises a horn 10, the inlet 11 of which is connected to a coupling 12. This connecting is preferably made by telescoping the inlet in the outlet of the coupling as indicated, so that the two may be readily separated by merely pulling them apart.

The coupling comprises the outlet 13 which receives the inlet of the horn, and the wing-shaped portion 14 which is open at its outer end except for the arms 7 which are fixed to the edges of the wing end of the coupling in any suitable manner. A slot 15 is provided for the passage of the tongue as it vibrates. When so arranged the only inlet to the horn comprises the space between the arm 7 and the tongue 8.

With this arrangement it will be seen that, when the harp is operated in the ordinary manner, the vibrations produced will pass into the horn, and will be amplified by the horn so as to materially increase the sound and also so as to produce more harmonious tones. It will be understood that, by detaching the horn from the coupling, the harp may be used in the ordinary manner, and not only is the combined harp and amplifier portable and very easily handled, but also by removing the horn the harp with the coupling is substantially the same as without the coupling, and the device may then be carried in the pocket or elsewhere very conveniently.

I claim as my invention:

1. The combination of a jew's harp and an amplifier, the harp having arms, and a tongue mounted between said arms, and the amplifier comprising a horn, having an inlet and an outlet, and means connecting said inlet to the arms of the harp. Said means comprising a coupling having an outlet telescoping with the inlet of said horn, and said coupling having an inlet, the end walls thereof being fixed to the arms of said harp.

2. The combination of a jew's harp and an amplifier, the harp having arms, and a tongue mounted between said arms, and the amplifier comprising a horn, having an inlet and an outlet and means connecting said inlet to the arms of the harp. Said means comprising a tubular member with one end telescoping with said inlet, and the other end fixed to said arms.

3. The combination of a jew's harp and an amplifier, the harp having arms, and a tongue mounted between said arms, and the amplifier comprising a horn, having an inlet and an outlet, and means connecting said inlet to the arms of the harp, and said member having a slot in its wall adjacent said arms for the passage of said tongue as it vibrates.

In testimony whereof, I hereunto set my hand.

HARRY W. PIDGEON.